US012669141B2

(12) United States Patent
Kwon et al.

(10) Patent No.: US 12,669,141 B2
(45) Date of Patent: Jun. 30, 2026

(54) VEHICLE MODULE CLIP

(71) Applicant: DAEHAN SOLUTION CO., LTD, Incheon (KR)

(72) Inventors: Choong Ho Kwon, Seoul (KR); Min Chan Kim, Incheon (KR)

(73) Assignee: DAEHAN SOLUTION CO., LTD, Incheon (KR)

( * ) Notice: Subject to any disclaimer, the term of this patent is extended or adjusted under 35 U.S.C. 154(b) by 266 days.

(21) Appl. No.: 18/515,336

(22) Filed: Nov. 21, 2023

(65) Prior Publication Data

US 2024/0200585 A1     Jun. 20, 2024

(30) Foreign Application Priority Data

Nov. 29, 2022     (KR) ......................... 10-2022-0162257

(51) Int. Cl.
 *F16B 2/20*      (2006.01)
 *B60N 3/02*     (2006.01)
(52) U.S. Cl.
 CPC ................ *F16B 2/20* (2013.01); *B60N 3/026* (2013.01)
(58) Field of Classification Search
 CPC .. F16B 2/20; F16B 21/086; F16B 2/24; F16B 2/241; F16B 2/243; F16B 2/22; F16B 37/043; B60N 3/026; Y10T 24/307; Y10T 24/306; Y10T 24/303; Y10T 24/304
 See application file for complete search history.

(56) References Cited

U.S. PATENT DOCUMENTS

| | | | | |
|---|---|---|---|---|
| 5,636,891 | A | * | 6/1997 | Van Order ................ B60R 7/04 224/313 |
| 2013/0202350 | A1 | * | 8/2013 | Kwon .................... F16B 21/086 403/335 |
| 2016/0115979 | A1 | * | 4/2016 | Kwon ..................... E05B 85/12 248/220.31 |
| 2016/0115987 | A1 | * | 4/2016 | Kwon ..................... E05B 79/06 248/27.3 |

FOREIGN PATENT DOCUMENTS

| | | |
|---|---|---|
| KR | 101275024 B1 | 6/2013 |
| KR | 20130094887 A | 8/2013 |
| KR | 101658519 B1 | 9/2016 |

* cited by examiner

*Primary Examiner* — Jack W Lavinder
(74) *Attorney, Agent, or Firm* — Dickinson Wright PLLC

(57)     ABSTRACT

In the present invention, two hooks have a predetermined distance therebetween, portions, from which elastic arms extend, of the flanges formed on end portions of the hooks have curvatures each having a predetermined radius to provide a sufficient space in which the two hooks are deformed to face each other when the module clip is assembled or disassembled, an angle between the elastic arms, which are formed in pairs and perform a hooking operation while passing through and fitted into the coupling hole and then restored to an original state, is decreased, and soft grooves are formed in the flanges to allow the elastic arms to be easily deformed so that the elastic arms are easily coupled to the coupling hole using a small force when the elastic arms pass through the coupling hole to perform the hooking operation and, when the module clip is disassembled from the coupling hole in a state in which the hooking operation is performed, lengths of the elastic arms decrease, so that a greater force is required for allowing the elastic arms to be forcibly deformed and disassembled from the coupling hole, so as not to easily separate the elastic arms from the coupling hole.

3 Claims, 8 Drawing Sheets

VEHICLE MODULE CLIP

CROSS-REFERENCE TO RELATED APPLICATION

This application claims priority to and the benefit of Korean Patent Application No. 10-2022-0162257, filed on Nov. 29, 2022, the disclosure of which is incorporated herein by reference in its entirety.

BACKGROUND

1. Field of the Invention

The present invention relates to a vehicle module clip, and more specifically, to a vehicle module clip in which a pair of flanges formed on both facing ends maintain a predetermined distance therebetween, each of the flanges has a predetermined radius, elastic arms, which are formed to protrude in pairs to face each other and perform a fixing operation while fitted into a coupling hole so that a distance between the elastic arms decreases and restored to an original state to be caught in an edge of the coupling hole, the distance therebetween decreases as an angle formed between the elastic arms is decreased, and soft grooves are formed in the flanges to allow the elastic arms to be easily deformed so that the hooks are easily inserted into and assembled with the coupling hole using a small force when inserted into and assembled with the coupling hole, prevented from being easily disassembled when disassembled after being assembled, and used safely.

2. Discussion of Related Art

In general, a module clip is used in a vehicle to couple two members into one such as when fixing an assist handle, and then to easily separate and reassemble the members as necessary. Such a module clip (fixture) is manufactured to be easily assembled or disassembled mainly using elasticity as described in Patent Document 1 to Patent Document 3 below.

(Patent Document 1) Korean Patent Registration No. 10-1658519

The invention is directed to providing a fixture for mounting a vehicle auxiliary handle, which can be easily mounted using a small force when mounted and easily dismounted using a small force when dismounted as necessary. In particular, the invention is also directed to proving a fixture for mounting a vehicle auxiliary handle manufactured through a method of pressing one panel or the like, in which widths, areas, heights, and the like of components are changed to mount or dismount the fixture using a small force so as to mount or dismount an auxiliary handle, and a fixed state of the auxiliary handle is also stably maintained.

(Patent Document 2) Korean Patent Registration No. 10-1275024

The invention is directed to providing a clip module for assembling a vehicle indoor handle, which improves the assembly performance of a clip using a minimum assembly force by minimizing a contact area between the clip for fixing an indoor handle and a vehicle body panel. In addition, the invention is also directed to providing a clip module for assembling a vehicle indoor handle, in which a pair of clips for fixing an indoor handle are integrally formed on a base plate to fix mounting positions of the clips or a fastening position of the indoor handle so that an assembly operation can be easily quickly performed through a one-touch method.

(Patent Document 3) Korean Patent Publication No. 10-2013-0094887

The invention is directed to providing a clip module for assembling a vehicle indoor handle, in which an indoor handle is fixed through an insertion method using a divided pin type clip to easily quickly assemble the clip module without a fixing unit such as a screw so as to improve productivity. In particular, the invention is also directed to providing a clip module for assembling a vehicle indoor handle, in which an injection or extrusion method is adopted for forming each of a clip and a base plate to mass-produce the clip modules in a short time so as to further improve production efficiency.

RELATED ART

Patent Document (Patent Document 1) Korean Patent Registration No. 10-1658519 (Registration Date: Sep. 12, 2016)

(Patent Document 2) Korean Patent Registration No. 10-1275024 (Registration Date: Jun. 10, 2013)

(Patent Document 3) Korean Patent Publication No. 10-2013-0094887 (Publication Date: Aug. 27, 2013)

However, the conventional module clips have the following problems.

(1) In the conventional module clip, two hooks to be deformed due to elastic support are positioned to face each other, and a hooking operation is performed while the hooks are fitted into a coupling hole, contracted, and restored to an original state. Accordingly, in order for the module clip to be firmly fixed to a member, a force for deforming the two hooks being fitted into the coupling hole, that is, an insertion force, should be great.

(2) Accordingly, an angle between a pair of hooks formed to face each other should be large. This is because, when the hooks are inserted into and assembled with a coupling hole, the angle between the hooks decreases and then increases to perform a hooking operation. Accordingly, a large force is required when assembling a module clip, and a small force is required when disassembling the module clip as necessary.

(3) As described above, when the small force is applied to the module clip, there is an advantage that the module clip can be disassembled using a small force when the module clip is disassembled for component repair, replacement, or the like, but in normal times, there is a possibility that the module clip is easily disassembled from a mounting position by vibrations generated from a vehicle or an external force applied to the module clip by a driver or passenger.

(4) Such a problem may cause the possibility that the driver and passenger are injured while a component fixed by the module clip is detached or disassembled.

The present invention is directed to providing a vehicle module clip, wherein two hooks formed on a base to face each other have a predetermined distance therebetween, portions, from which elastic arms extend, of the flanges formed on end portions of the hooks have curvatures each having a predetermined radius to provide a sufficient space in which the two hooks are deformed to face each other when the module clip is assembled or disassembled, an angle between the elastic arms, which are formed in pairs and perform a hooking operation while passing through and fitted into the coupling hole and then restored to an original state, is decreased, and soft grooves are formed in the flanges to allow the elastic arms to be easily deformed so that the elastic arms are easily coupled to the coupling hole using a small force when the elastic arms pass through the coupling hole to perform the hooking operation and, when the module clip is disassembled from the coupling hole in a state in which the hooking operation is performed, lengths of the elastic arms decrease, and thus a greater force is required for allowing the elastic arms to be forcibly deformed and disassembled from the coupling hole, so as not to easily separate the elastic arms from the coupling hole.

According to an aspect of the present invention, there is provided a vehicle module clip that is fastened to a first member using a screw and passes through, is fitted into, and is assembled with a coupling hole (11) formed in a second member (10), the vehicle module clip including a base (110) fastened to the first member using the screw and a pair of hooks (120) that are bent from both edges of the base (110) and fitted into and assembled with the coupling hole (11), wherein the base (110) includes guides (112) positioned between the two hooks (120) and cut to protrude to face each other, the guides (112) are formed so that a distance between two guides (112) facing each other increases as a distance from the base (110) to the two guides (112) increases, and the hooks (120) include a pair of support arms (121) that are obliquely bent from both sides of the base (110) in directions to face each other and of which one edges are formed to be bent by as much as have a predetermined width to face each other, a pair of flanges (122) that are bent from protruding ends of the support arms (121) to each have a radius (R) of 1.5 mm to 1.9 mm, formed to extend toward both sides of the support arms (121), and positioned to face each other with a distance (G) of 0.8 mm to 1.2 mm therebetween, two pairs of elastic arms (123) that are integrally formed with both sides of the flanges (122) obliquely in directions away from each other and in which a width (W) and an angle (θ) between two elastic arms (123) are in a range of 15.8 mm to 16.2 mm and a range of 58° to 62°, respectively, steps (124) that are bent from end portions of the elastic arms (123) to face each other and caught in the coupling hole (11), and soft grooves (122a) formed in portions of the flanges (122) in contact with the support arms (121) to allow the elastic arms (123) to be easily deformed.

In particular, one or more beads (126) may be further formed on the support arms (121) in an outward direction of the base (110), and one or more beads (127) may be further formed on the elastic arms (123) in the outward direction of the base (110).

In addition, one or more noise prevention protrusions (125) may be formed on facing surfaces of the flanges (122).

The above and other objects, features and advantages of the present invention will become more apparent to those of ordinary skill in the art by describing exemplary embodiments thereof in detail with reference to the accompanying drawings, in which:

FIGS. 2A and 2B are a set of views of a state in which the vehicle module clip is fastened to a second member according to the present invention, wherein FIG. 2A is a front view, and FIG. 2B is a side view;

Figure 6:
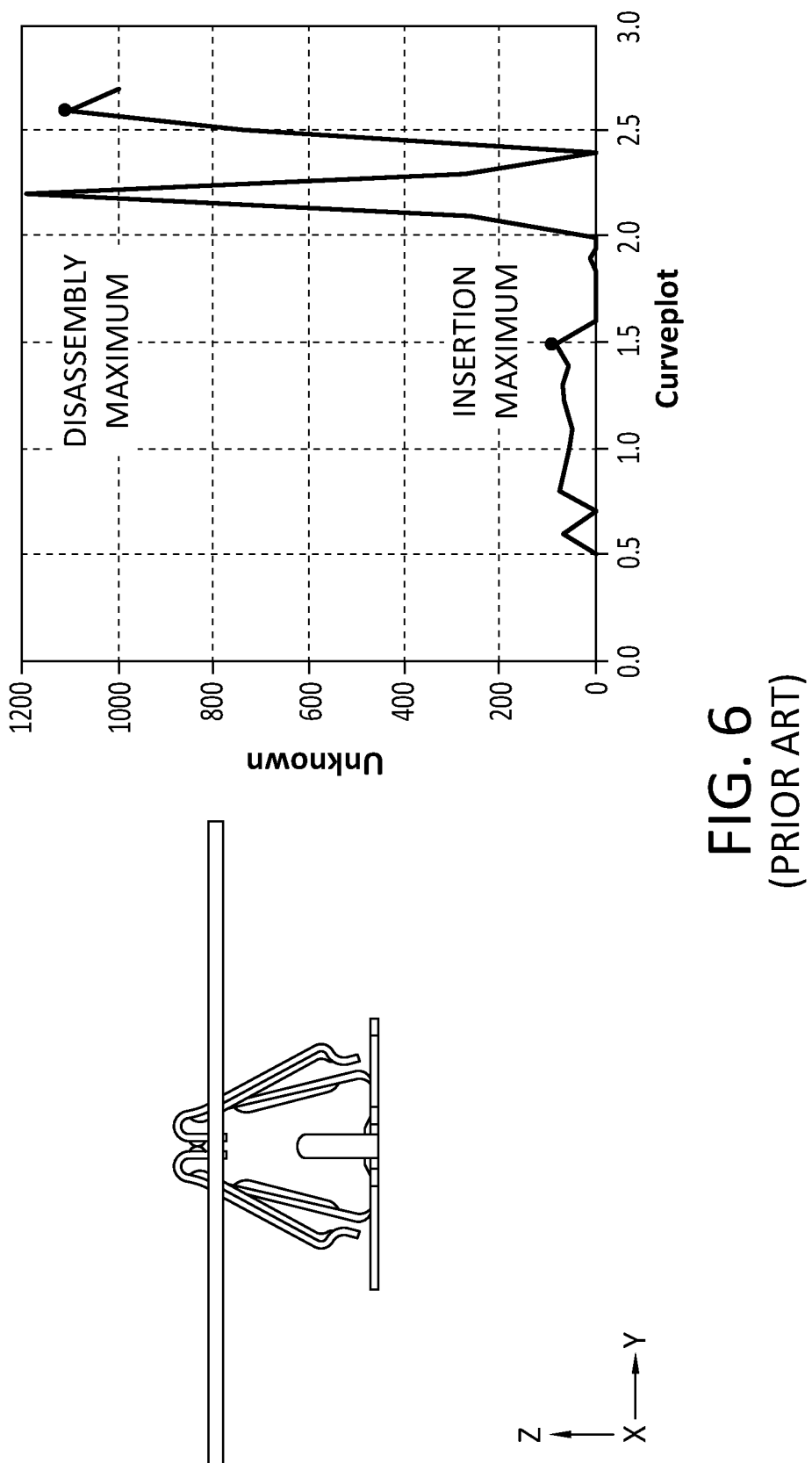
Figure 7:
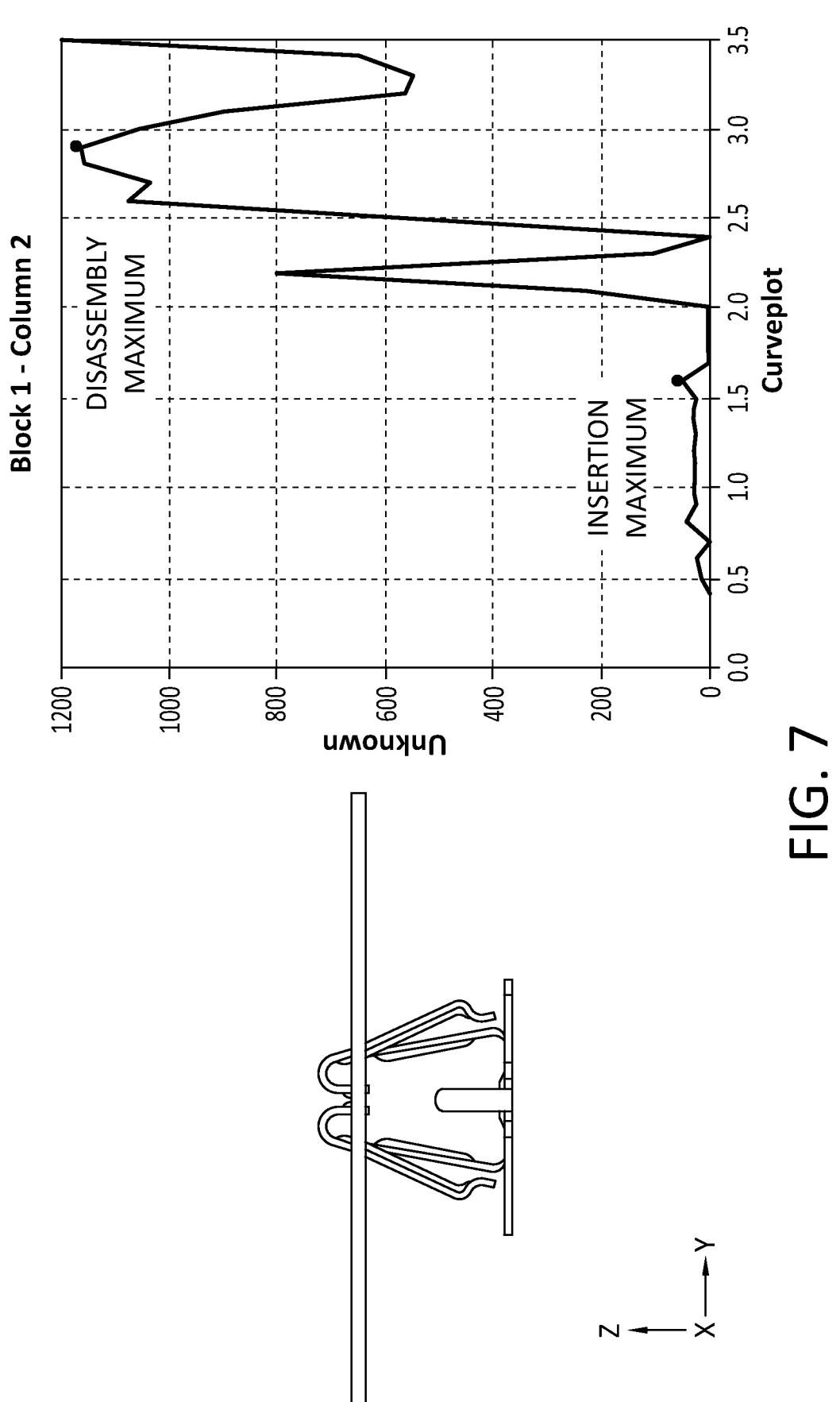

FIG. 6 is a graph showing measured forces required for insertion and disassembly of the conventional module clip when the clip is perpendicularly inserted into the second member and disassembled from the second member at an angle of 45°; and FIG. 7 is a graph showing measured forces required for insertion and disassembly of the module clip according to the present invention when the clip is perpendicularly inserted into the second member and disassembled from the second member at an angle of 45°.

DETAILED DESCRIPTION OF EXEMPLARY EMBODIMENTS

Hereinafter, exemplary embodiments of the present invention will be described in more detail with reference to the accompanying drawings. Moreover, terms and words used in the present specification and claims should not be interpreted as being limited to commonly used meanings or meanings in dictionaries and should be interpreted as having meanings and concepts which are consistent with the technological scope of the invention based on the principle that the inventors have appropriately defined concepts of terms in order to describe the invention in the best way.

Therefore, since the embodiments described in this specification and components illustrated in the drawings are only exemplary embodiments and do not represent the overall technological scope of the invention, it should be understood that there may be various equivalents or modifications substituting the exemplary embodiments at the time of filing of this application.

[Structure of Vehicle Module Clip]

As illustrated in FIGS. 1 to 7, a module clip 100 according to the present invention includes a base 110 and a pair of hooks 120.

In particular, in the hooks 120, as a pair of elastic arms 123 formed in an arrowhead shape to face each other are formed so that a width W and an angle θ therebetween are as small as 15.8 mm to 16.2 mm and 58° to 62°, respectively, when the elastic arms 123 are fitted into and assembled with a coupling hole 11 formed in a second member, since an interfering portion is small, the elastic arms 123 can be easily fitted into and assembled with the coupling hole 11, and conversely, when the elastic arms 123 are disassembled, as the angle decreases as described above, a large force is required to deform the elastic arms 123 shortened as the angle decreases, and thus the elastic arms 123 cannot be easily separated.

In addition, in the pair of hooks 120, as flanges 122 formed on end portions of the pair of hooks 120 to face each other are formed to be spaced a predetermined distance G from each other, and a portion of each of the flanges 122 formed to be wound in an arc shape and then extending as one of the elastic arms is formed to have a predetermined radius R, when the pair of hooks 120 are assembled with or disassembled from the coupling hole 11 formed in the second member 10, the pair of hooks 120 are not only easily deformed and easily assembled using a small force but also conveniently disassembled using a small force when disassembled as necessary.

In this case, as the distance G is selected in the range of 0.8 mm to 1.2 mm and the radius R is selected in the range of 1.5 mm to 1.9 mm, assembly or disassembly can be easily conveniently performed without reducing a force for assembly or disassembly too much.

Finally, portions of the flanges 122 in contact with support arms 121 are cut to form soft grooves 122a to allow the support arms 121 to be easily deformed.

Hereinafter, such a structure will be described in more detail with reference to the accompanying drawings. In this case, a first member and the second member are members installed to face each other in a vehicle, and examples of the first member and the second member may be a head liner (first member) and an assist handle (second member).

A. Base

Figure 1:
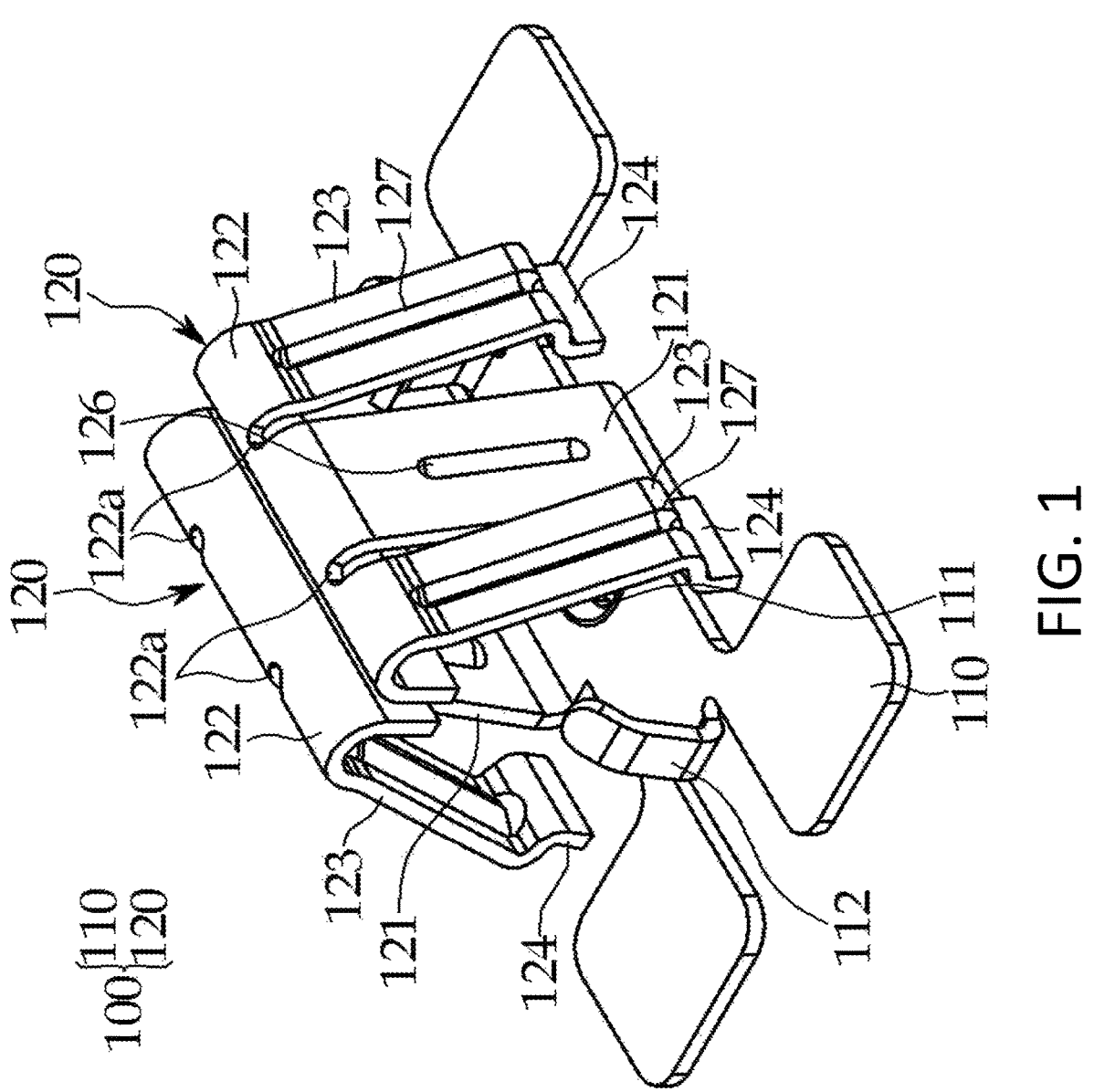
FIG. 1 is a perspective view of an entire structure of a vehicle module clip according to the present invention.
Figure 2A:
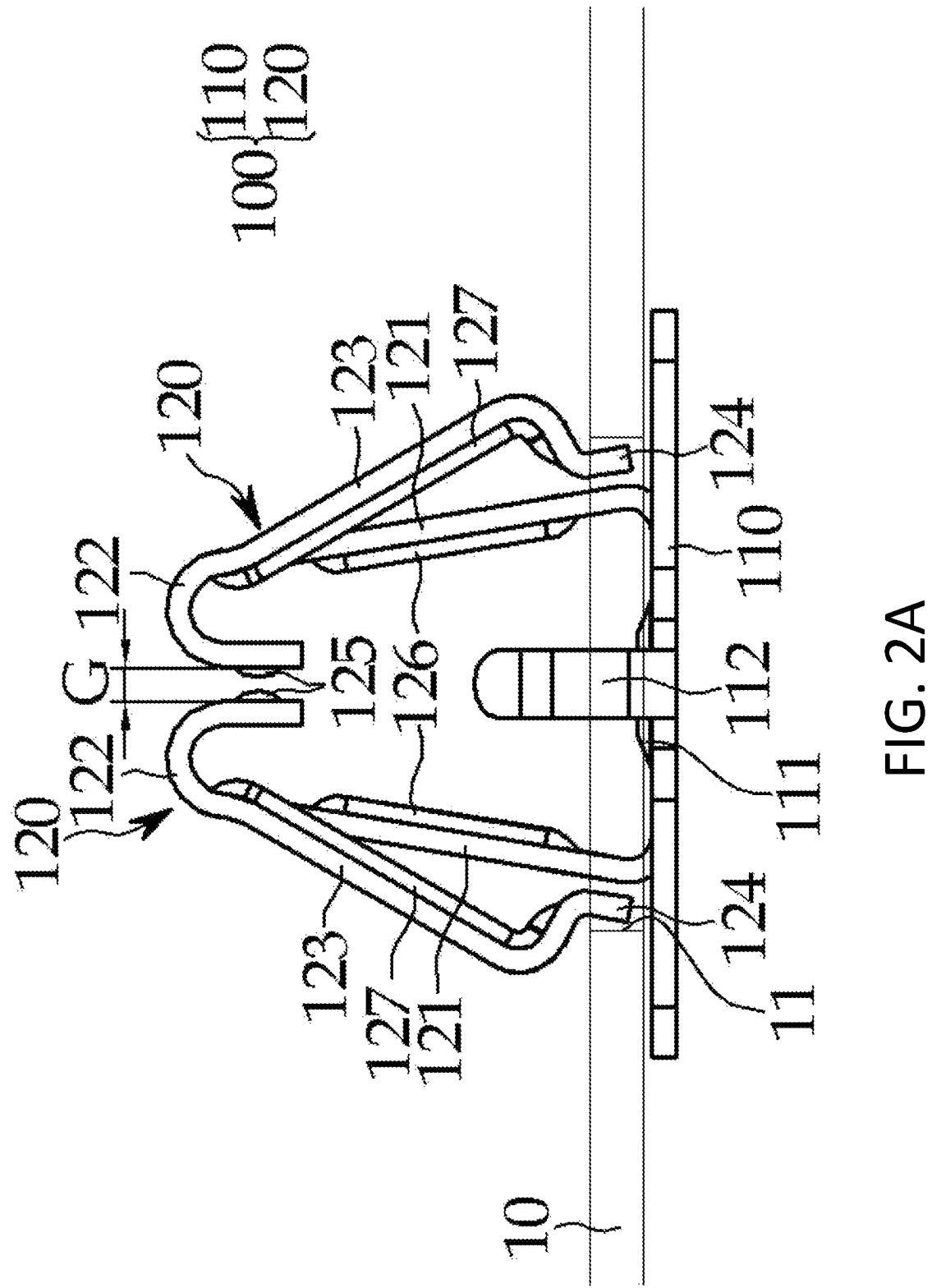
Figure 2B:
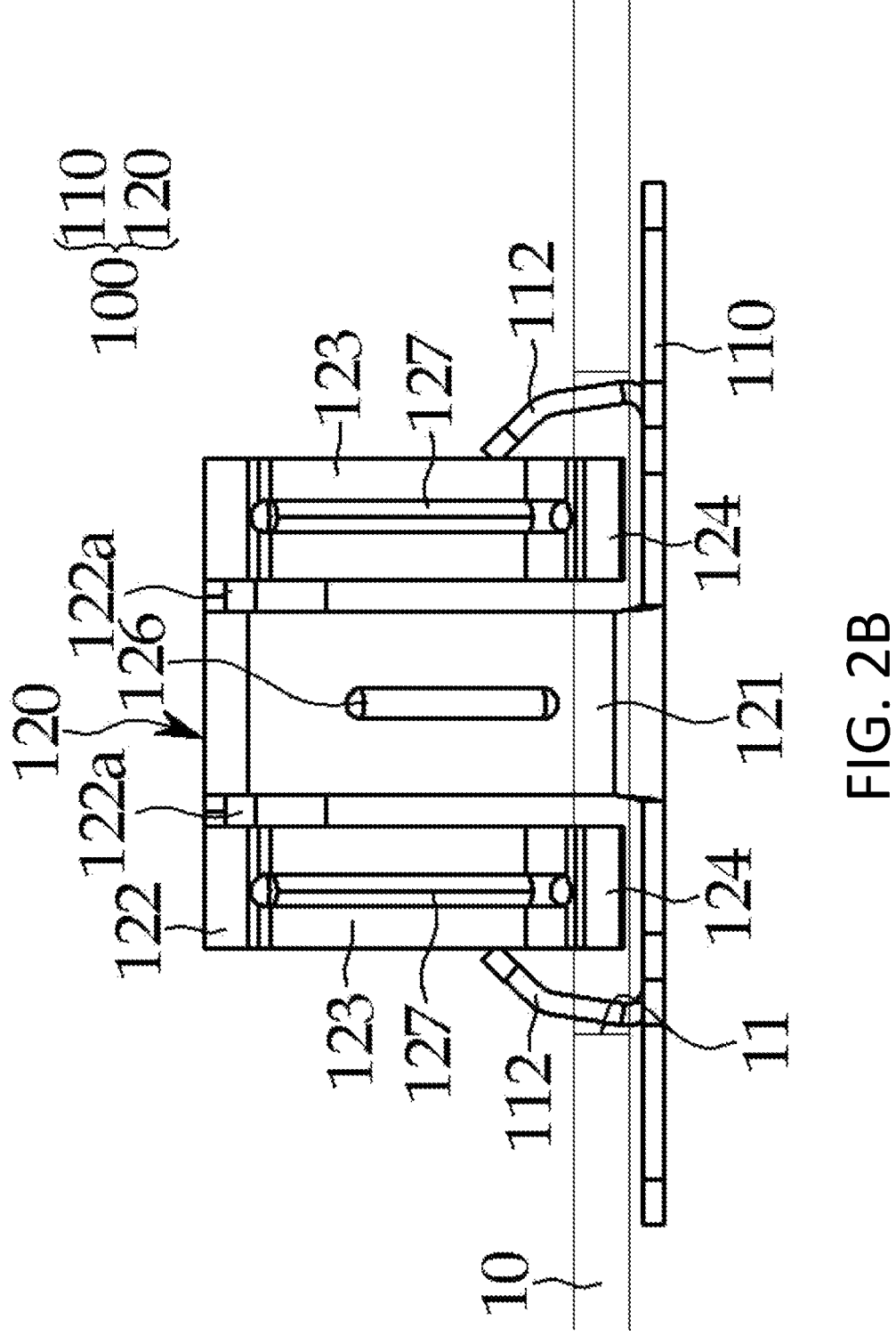
Figure 3:
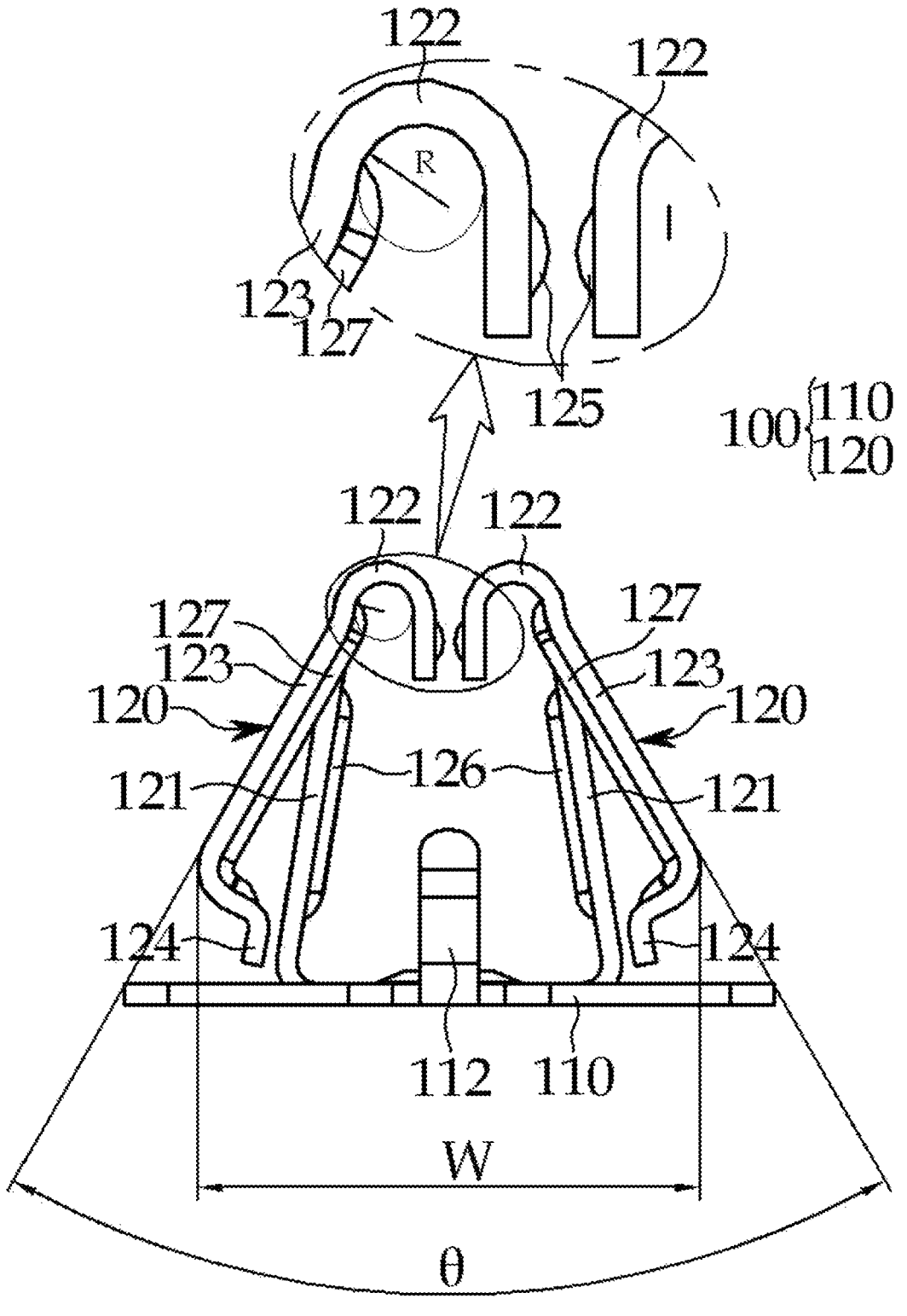
FIG. 3 is a front view of the entire structure of the vehicle module clip according to the present invention.

As illustrated in FIGS. 1 to 3, the base 110 is integrally formed with the hooks 120, which will be described below, using a steel plate formed in a flat plate shape having a predetermined size. In this case, a fastening hole 111 is formed in a center of the base 110, the hooks 120 are integrally formed on both edges of the base 110, and guides 112 are formed between the hooks.

1. Fastening Hole

As illustrated in FIG. 1, the fastening hole 111 is formed to pass through a middle portion of the base 110 and used when the base 110 is in close contact with and integrally fixed to the first member using a screw or the like.

2. Guide

As illustrated in FIGS. 1 to 3, two guides 112 are formed on the base 110 to be positioned between the hooks 120 that will be described below. In this case, the guides 112 are formed to face each other and formed in bent shapes such that a distance between the two guides 112 facing each other decreases in an outward direction of the base 110.

As described above, as the guides 112 are formed on end portions of both sides of the hooks 120 formed to face each other as illustrated in FIG. 2, when the module clip 100 according to the present invention is assembled, upper portions of the guides 112 are fitted into the coupling hole 11 of a second member 10 so that the module clip 100 is guided to be assembled at a predetermined position. In addition, lower portions of the guides 112 are in close contact with an inner surface of the coupling hole 11 formed in the second member 10 to prevent the movement of the module clip 100.

B. Hook

As illustrated in FIGS. 1 to 3, the hooks 120 are integrally formed with the base 110 when a pressing process is performed on the base 110 and include the support arms 121 formed on both sides of the base 110 to be obliquely bent to face each other, the flanges 122 formed to extend toward both sides from upper end portions of the support arms 121, the elastic arms 123 formed from both sides of the flanges 122 to be bent in directions away from each other, steps 124, which are bent from end portions of the elastic arms 123 and caught in the coupling hole 11 of the second member 10, and first soft grooves 122a allowing the elastic arms 123 to be easily elastically deformed. In addition, the hooks 120 may further include noise prevention protrusions 125 and beads 126 and 127.

1. Support Arm

As illustrated in FIGS. 1 to 3, the support arms 121 are for firmly connecting the hooks 120 to the base 110 and are obliquely bent from both sides of the base 110 such that end portions of the support arms 121 are symmetrically formed to face each other.

In addition, in order to reinforce the strength of the support arms 121, at least one bead 126 may be further formed to extend in a longitudinal direction of the support arm 121. In this case, when several beads 126 are formed, the beads 126 may be formed in parallel.

2. Flange

As illustrated in FIGS. 1 to 3, the flanges 122 are for reinforcing the strength and rigidity of upper portions of the support arms 121, the flanges 122 are bent by predetermined lengths so that end portions of the support arms 121 face each other, the flanges 122 extend toward both sides of the support arms 121, and thus an overall shape of the support arms 121 and the flanges 122 is a "T" shape.

In this case, in the exemplary embodiment of the present invention, as illustrated in FIG. 2A, the two flanges 122 formed on two hooks 120 to face each other may be formed to be positioned with the predetermined distance G therebetween. This is to allow that, when the hooks 120 are inserted into the coupling hole 11, the distance between the hooks 120 can be easily decreased so that the hooks 120 can be easily assembled, and the hooks 120 are conveniently disassembled as necessary. The distance G may be in the range of 0.8 mm to 1.2 mm.

In addition, in the exemplary embodiment of the present invention, the flange 122 is manufactured so that an end portion thereof is formed in an arc shape having the predetermined radius R as shown in FIG. 3. This is to provide a space in which the elastic arms 123, which will be described below, are easily deformed and assembled when the hooks 120 are fitted into the coupling hole 11 and conveniently disassembled when necessary. The radius R may be in the range of 1.5 mm to 1.9 mm.

3. Elastic Arm and Step

As illustrated in FIGS. 1 to 3, the elastic arms 123 are formed on both sides of the flange 122 to unfold in outward directions toward the base 110. That is, a distance between the elastic arms 123 increases in an arrowhead shape and decreases when the elastic arms 123 are fitted into the coupling hole 11, the elastic arms 123 restore to an original state thereof when the elastic arms 123 are further fitted therein, and thus the elastic arms 123 provide an elastic force.

In the exemplary embodiment of the present invention, the angle θ and the width W formed between the two facing elastic arms 123 formed on the flanges 122 may be in the range of 58° to 62° and the range of 15.8 mm to 16.2 mm, respectively. This is because, as the angle θ formed between the two elastic arms 123 is smaller than that of the conventional case, the elastic arms 123 having the arrowhead shape that pass through the coupling hole 11 can be easily deformed to correspond to a diameter of the coupling hole 11 so as to reduce a force used for assembly. Conversely, when an external force is applied to the elastic arms 123 coupled to the coupling hole 11, since lengths of the elastic arms 123 are smaller than those of the conventional case, a greater force is applied when a smaller length is deformed as compared to a greater length, and thus a greater force is required to forcibly deform the elastic arms 123 to separate the elastic arms 123 from the coupling hole 11 so as to prevent the module clip from escaping or being easily separated.

As illustrated in FIGS. 1 and 3, the steps 124 are formed on ends of the elastic arms 123, and in particular, as the hooks 120 are fitted into the coupling hole 11, the elastic arms 123 are elastically deformed in directions facing each other, when the elastic arms 123 are completely fitted, the elastic arms 123 restores to their original positions, and then the steps 124 are in close contact with an inner circumferential surface of the coupling hole 11 to perform a hooking operation.

The elastic arms 123 and the steps 124 formed as described above are for fixing the module clip 100 to the coupling hole 11 of the second member 10. When the hooks 120 are positioned at and pushed toward the coupling hole 11 of the second member 10, the elastic arms 123 are deformed in directions facing each other and fitted into the coupling hole 11 of the second member 10, and then elastically restored again, accordingly, the steps 124 are in close contact with the inner surface of the coupling hole 11, and thus the module clip 100 is firmly fixed to the coupling hole 11.

Meanwhile, at least one long bead 127 may be further formed in the elastic arm 123 in a longitudinal direction in order to improve the strength of the elastic arm 123. In this case, when several beads 127 are formed, the beads 126 may be formed in parallel.

4. Noise Prevention Protrusion

As illustrated in FIGS. 2 and 3, one or more noise prevention protrusions 125, which suppress noise generated by the flanges 122 protruding in directions facing each other when the flanges 122 come into contact with each other, are provided on surfaces of the flanges 122 facing each other. In this case, since the noise prevention protrusions 125 comes into point contact with each other, noise generation can be minimized even when the module clip 100 is distorted by external force.

5. Soft Groove

As illustrated in FIGS. 1 and 2, the flanges 122 in contact with the support arms 121 are cut to form soft grooves 122a. In this case, as the soft grooves 122a are formed in longitudinal directions of the support arms 121, the flanges 122 can be easily deformed, and as a result, the elastic arms 123 can be elastically deformed.

As described above, in the present invention, as the angle and the distance between the two elastic arms formed in the arrowhead shape to face each other decrease, the hooks not only can be easily fitted into and coupled with the coupling hole but also can be prevented from being arbitrarily separated or escaped therefrom because a greater force is required when the assembled hooks are disassembled.

[Fitting Force and Disassembling (Separating) Force Analysis Result]

The results of simulation for forces used for insertion and disassembly of the module clip (example) according to the present invention formed as described above and the conventional module clip (comparative example) are shown in FIGS. 4 to 7.

Figure 4:
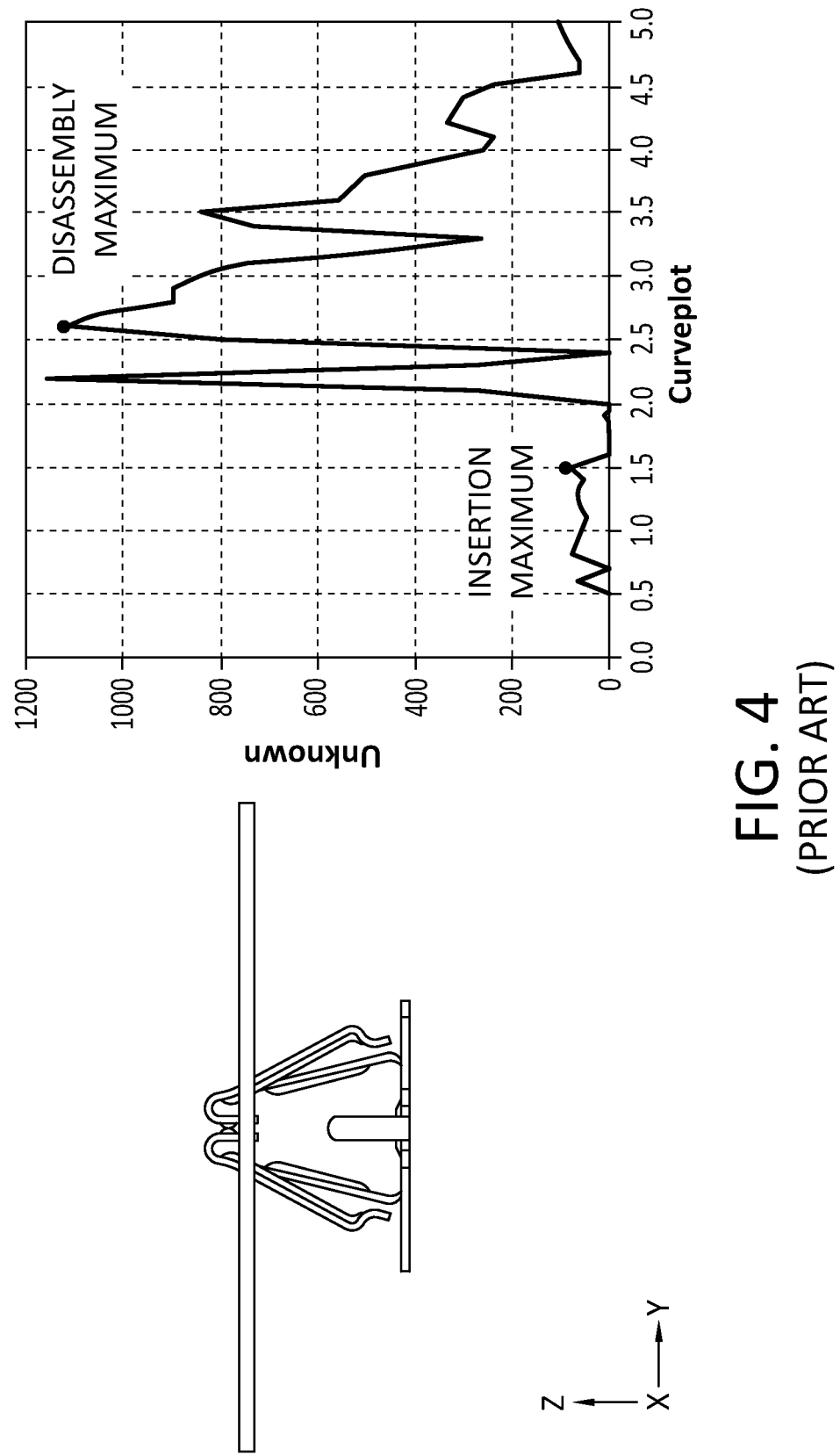
FIG. 4 is a graph showing measured forces required for insertion and disassembly of a conventional module clip when the clip is perpendicularly inserted into and disassembled from a second member.
Figure 5:
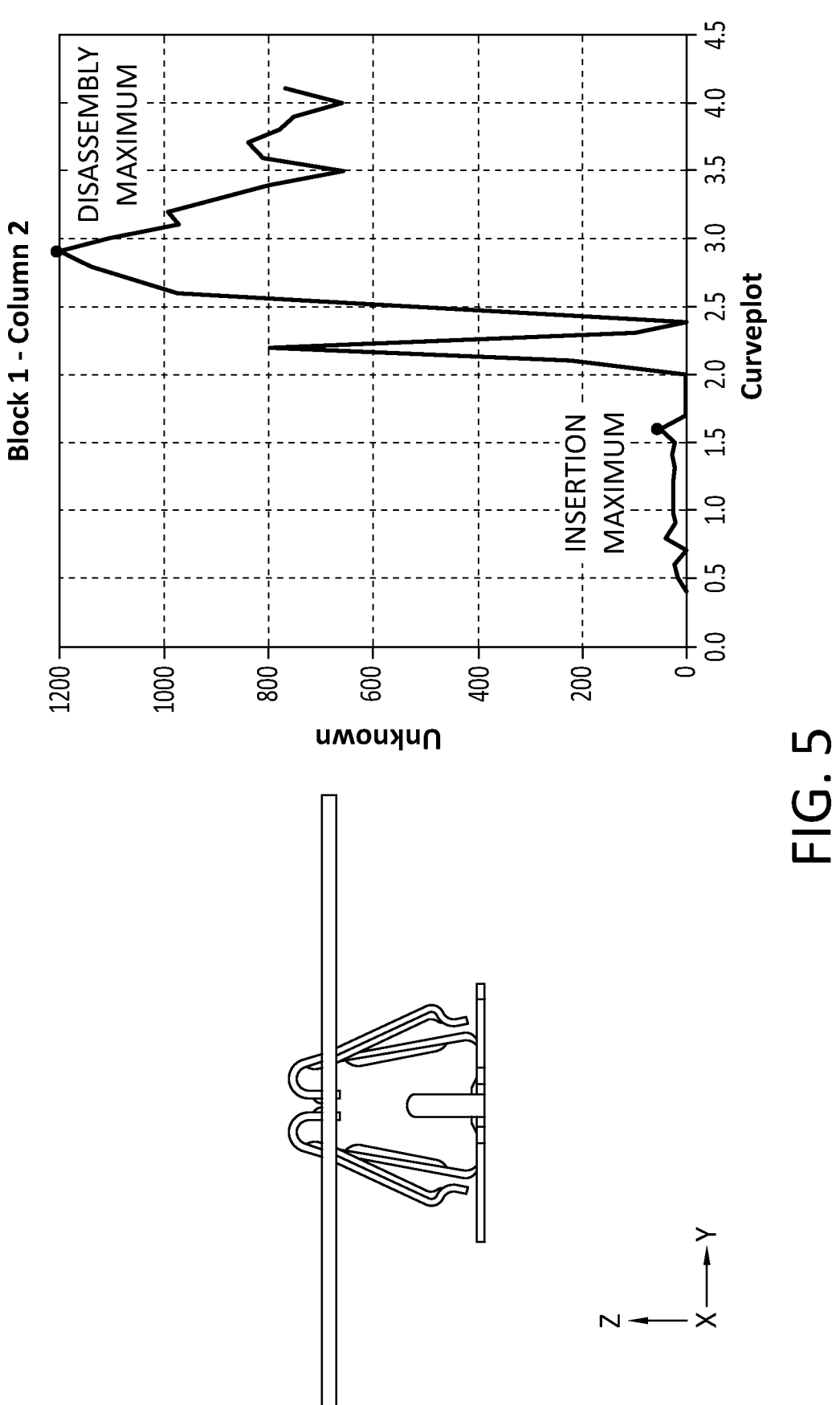
FIG. 5 is a graph showing measured forces required for insertion and disassembly of the module clip according to the present invention when the clip is perpendicularly inserted into and disassembled from a second member.

FIGS. 4 and 5 are graphs showing forces applied when the example and the comparative example are perpendicularly inserted into and assembled with the first member and then perpendicularly disassembled (separated) from the first member. As a result, it can be seen that, in the comparative example, a maximum force for insertion is 8.1 kgf and a force for disassembly (separation) is 113.7 kgf as shown in FIG. 4, and in the example, a maximum force for insertion is 4.6 kgf and a maximum force for separation (disassembly) is 122.1 kgf as shown in FIG. 5. As described above, the module clip of the example can be disassembled when a greater force is applied thereto.

In addition, FIGS. 6 and 7 are graphs showing forces applied when the example and the comparative example are perpendicularly inserted into and assembled with the first member and then disassembled (separated) from the first member at an angle of 45°. As a result, it can be seen that, in the comparative example, a maximum force for insertion is 8.1 kgf and a force for disassembly (separation) is 117.9 kgf as illustrated in FIG. 6, and in the example, a maximum force for insertion is 4.6 kgf and a maximum force for removal is 118.7 kgf as illustrated in FIG. 7. As described above, the module clip of the example can be disassembled when a greater force is applied thereto.

A vehicle module clip according to the present invention has the following effects.

(1) As elastic arms, which are formed in pair to face each other and perform a hooking operation while passing through and fitted into a coupling hole of a second member so that a distance between the elastic arms decreases and increases, are manufactured so that an angle between the elastic arms is small, a magnitude of a force applied to perform an assembly operation by allowing the elastic arms to pass through the coupling hole as described above can be reduced. Accordingly, the module clip can be assembled using a small force.

(2) In addition, when an external force is applied to the module clip assembled as described above, since the elastic arms, in which a length is decreased by adjusting the angle between the elastic arms, should be forcibly deformed, a stronger force is required compared to when a length is long. That is, when the module clip is disassembled, since a stronger external force is required compared to when the angle between the elastic arms is large, the module clip, which is mounted once, does not easily escape or separate, and thus the module clip can be used safely.

(3) As the two hooks installed on a base to face each other are formed to be spaced a predetermined distance from each other, a space, in which the two hooks are deformed as much as the distance when fitted into and assembled with the coupling hole, is secured. Accordingly, since a force required when the module clip is assembled can be reduced as much as that, the module clip can be easily conveniently assembled.

(4) In addition, as each of the flanges formed on ends of the hooks to face each other is formed to be curved at a predetermined radius, when the hooks are fitted into and assembled with the coupling hole, a space, in which the elastic arms integrally formed to extend from the flanges move to face each other, is sufficiently provided. Accordingly, when the module clip is assembled, an insertion force by which the hooks pass through and enter the coupling hole can be reduced, and thus the module clip can be easily conveniently assembled.

(5) Meanwhile, in addition to such a structure, as soft grooves are formed in the flanges so that the elastic arms can be easily deformed, the hooks can be easily assembled, cannot be easily separated, and thus can be used safely.

What is claimed is:

1. A vehicle module clip that is fastened to a first member using a screw and passes through, is fitted into, and is assembled with a coupling hole (11) formed in a second member (10), the vehicle module clip comprising:

a base (110) fastened to the first member using the screw; and a pair of hooks (120) that are bent from both edges of the base (110) and fitted into and assembled with the coupling hole (11), wherein the base (110) includes guides (112) positioned between the pair of hooks (120) and cut to protrude to face each other, the guides (112) are formed so that a distance between the guides (112) facing each other decreases as a distance from the base (110) to the two-guides (112) increases, and the hooks (120) include a pair of support arms (121) that are obliquely bent from both sides of the base (110) in directions to face each other by a predetermined width, a pair of flanges (122) that are bent from protruding ends of the pair of support arms (121) to each have a radius (R) of 1.5 mm to 1.9 mm, and positioned to face each other with a distance (G) of 0.8 mm to 1.2 mm therebetween, a pair of elastic arms (123), each arm being integrally formed with a respective side of respective flanges (122) and extending obliquely in directions away from each other and in which a width (W) and an angle (θ) between the pair of elastic arms (123) facing each other are in a range of 15.8 mm to 16.2 mm and a range of 58° to 62°, respectively, steps (124) that are bent from end portions of the pair of elastic arms (123) to face each other and caught in the coupling hole (11), and soft grooves (122*a*) formed in portions of the pair of flanges (122) in contact with the pair of support arms (121) to allow the pair of elastic arms (123) to be easily deformed.

2. The vehicle module clip of claim 1, wherein:

one or more beads (126) are further formed on the pair of support arms (121) in an outward direction of the base (110); and one or more beads (127) are further formed on the pair of elastic arms (123) in the outward direction of the base (110).

3. The vehicle module clip of claim 1, wherein one or more noise prevention protrusions (125) are formed on facing surfaces of the pair of flanges (122).

\* \* \* \* \*